United States Patent [19]
Obata

[11] Patent Number: 5,635,708
[45] Date of Patent: Jun. 3, 1997

[54] OPTICAL SCANNING APPARATUS HAVING A FIXED COMPOUND REFLECTIVE ASSEMBLY FOR TWO-DIMENSIONAL SCAN CAPABILITY AND METHOD THEREOF

[75] Inventor: Kenzo Obata, Okazaki, Japan

[73] Assignee: Nippondenso Co., Ltd., Kariya, Japan

[21] Appl. No.: 490,526

[22] Filed: Jun. 14, 1995

[30] Foreign Application Priority Data

Jun. 14, 1994 [JP] Japan ................................. 6-132014
May 29, 1995 [JP] Japan ................................. 7-130444

[51] Int. Cl.⁶ .......................................................... H01J 3/14
[52] U.S. Cl. .......................... 250/234; 359/201; 235/472
[58] Field of Search .................................... 250/234, 235, 250/208.2, 566, 568, 201.1, 201.2, 203.1–203.6; 235/472, 462; 359/201, 202, 224, 212–214; 348/771

[56] References Cited

U.S. PATENT DOCUMENTS

| | | | |
|---|---|---|---|
| 4,871,904 | 10/1989 | Metlitsky et al. | 359/201 |
| 4,944,580 | 7/1990 | Bruce et al. | 250/201.1 |
| 4,954,789 | 9/1990 | Sampsell | 359/318 |
| 5,021,641 | 6/1991 | Swartz et al. | 235/467 |
| 5,157,556 | 10/1992 | Hügenell | 250/201.1 |
| 5,212,582 | 5/1993 | Nelson | 359/224 |
| 5,213,893 | 5/1993 | Kobayashi et al. | 428/402 |

FOREIGN PATENT DOCUMENTS

| | | |
|---|---|---|
| 58-106520 | 6/1983 | Japan. |
| 3179580 | 8/1991 | Japan. |
| 4337884 | 11/1992 | Japan. |

*Primary Examiner*—Que Le
*Attorney, Agent, or Firm*—Cushman, Darby & Cushman IP Group of Pillsbury Madison & Sutro L.L.P.

[57] ABSTRACT

An optical scanner with high optical scanning speed without low optical information detection accuracy and which has superior shock and vibration resistance because of its light weight has a scanner used for directing the reflected light to a light receiving element during optical scanning of an object to be read. The scanner has an optical scanning mirror and multiple light receiving mirrors placed at the sides of the scanning member. Each of the mirrors are mounted on a base, through supporting columns and beams so that they can be displaced in two-dimensional directions. Also, electrodes are provided opposite each of the mirrors on the base. Then, by generating electrostatic force through the application of electric voltage between the electrodes and the mirrors, the optical scanning mirror is displaced in the optical scanning direction with all of the reflective sides of each of the light receiving mirrors displaced to form a convex shape that always direct the reflected light to the light receiving element. As a result, optical scanning can be performed at a high speed with miniaturization of the apparatus possible.

30 Claims, 11 Drawing Sheets (67, 68 ONLY)

OPTICAL SCANNING APPARATUS HAVING A FIXED COMPOUND REFLECTIVE ASSEMBLY FOR TWO-DIMENSIONAL SCAN CAPABILITY AND METHOD THEREOF

CROSS-REFERENCE TO RELATED APPLICATIONS

This application is related to and claims priority from Japanese Patent Applications Nos. Hei-6-132014 and 7-130444, the contents of which are hereby incorporated by reference.

BACKGROUND OF THE INVENTION

1. Field of the Invention

This invention concerns an optical scanning apparatus which converts optical information obtained by receiving reflected light after illuminating an object carrying optical information to a corresponding electrical signal.

2. Description of the Related Art

Up to now, an optical scanning apparatus which illuminates an object to be read with laser light or the like and converts the optical information to a corresponding electric signal by receiving the reflected light therefrom has been used in optical information readers which are used for obtaining optical information from objects that carry optical information such as bar codes.

An optical scanning apparatus of the same type disclosed in Japanese Patent Laid-Open Publication No. Hei. 3-179580 which integrates an optical scanning mirror for illumination scanning and a light receiving mirror for receiving the reflected light has been designed to miniaturize the optical scanning apparatus.

In other words, as shown in FIG. 11, a conventional optical scanning apparatus used in a bar code reader 82 to read the bar code 80a from a bar code label 80 includes a light source 84 which generates light to illuminate the bar code 80 as a parallel beam through a collimating lens 84a, a flat optical scanning mirror 86 for optically scanning the bar code 80 by reflecting light from the light source 84, a light receiving element 88 which receives light reflected from the bar code label 80 when the bar code is optically scanned and then converts it to an electrical signal, a light receiving convex mirror 90 for directing the reflected light from the bar code label 80 to the light receiving element 88, and a light receiving lens 92 for focusing the light that was directed to the light receiving element 88 by the convex plane mirror 90 on the light receiving element 88. By integrating the flat mirror 86 and the convex plane mirror 90 and fixing them on the shaft of a motor 94, one known optical scanning apparatus which can simultaneously control optical scanning and light receiving through the rotation of the motor 94 is realized.

In FIG. 11, numeral 96 refers to a window formed in the bar code reader 82 through which the light for illuminating the label 80 and the light reflected from the bar code label 80 passes. Numeral 98 refers to a switch which activates the optical scanning apparatus to read the bar code 80a.

For the conventional optical scanning apparatus described above, light generated by the light source 84 and passing through the collimating lens 84a is reflected by the plane mirror 86 and radiated outside after passing through the window 96. Since the flat mirror 86 oscillates sideways in accordance with the rotation of the motor 94, a scanning line is formed as a result of this oscillation. Therefore, if objects to be read such as the bar code 80 and the like are placed along this scanning line, the light for illumination would be reflected irregularly from the objects to be read. Then, the irregularly reflected light reaches the convex mirror 90 through the window 96 and is directed by the convex mirror 90 to the light receiving element 88 and also is directed to the light receiving point of a light receiving element 88 through the light receiving lens 92. During this time, since the convex mirror 90 oscillates together with the plane mirror 86, the reflected light is always directed in the direction of the light receiving element 88 and thus, light is received efficiently by the light receiving element 88.

For the conventional optical scanning apparatus described above, because the plane mirror 86 for optical scanning and the convex mirror 90 for receiving light are oscillate together using only one motor 94, optical scanning of the object to be read and the receiving of the reflected light can be done performed efficiently and in addition, simplification of the structure of the apparatus is possible. However, by convention, since the convex mirror 90 with the plane mirror 86 mounted thereon oscillates responsive to the motor 94, there is a significant load applied to the rotational axis of the motor 94 and thus, one problem is that the plane mirror 86 and the convex mirror 90 cannot oscillate at high speeds using the motor 94.

Moreover, even if substrates formed beforehand to correspond to the plane mirror 86 and the convex mirror 90 which have surfaces plated with aluminum, gold or the like are used to reduce the load applied to the motor 94, the reflecting mirror member is large in size and thus, a relatively large motor 94 must be used and simply reducing the weight of the reflecting mirror member would not make it oscillate faster.

In other words, with conventional optical scanning apparatus, because of limits due to the characteristics of the motor, the weight of the mirror and the like, optical scanning, while possible at rates of tens of Hz, is impossible at high speeds such as tens of kHz.

In addition, because there is a need to install a large reflecting mirror on the rotation axis of the motor 94, a heavy load is applied to the rotation axis when it receives shocks from the outside and thus, there are problems with its shock and vibration resistance.

Furthermore, in the prior art, since the reflecting mirror, which is used for optical scanning and light receiving, oscillates due to the rotation of the motor, the scanning direction is limited to the one-dimensional direction that corresponds to the direction of the rotation of the motor and thus, for example, it was not possible to change the illumination point in the one-way optical scanning for reading each label of a multiple-row bar code label. In other words, while the conventional optical scanning apparatus can displace the reflective mirror for optical scanning and light receiving in a one-dimensional direction, it cannot perform displacements in a two-dimensional direction. As used herein, "one dimensional direction" means mirror displacement along one axis thereof, while "two dimensional direction" means mirror displacement along two mirror axes, e.g., x and y axes.

SUMMARY OF THE INVENTION

In consideration of these problems, this invention aims to provide the optical scanning apparatus which, in comparison with the conventional optical scanning apparatus that uses the motor, achieves a faster scanning speed without experiencing drops in the detection accuracy of the optical information and has superior shock-proof and vibration-proof properties due to its light weight.

To achieve these aims, a first aspect of the present invention provides an optical scanning apparatus which includes a light emission device for illuminating an object to be read that has optical information affixed to it with an illuminating light, a light receiving device which receives a reflected light which is reflected from the object to be read after the illuminating light from the light emission device shines on it and converts it to electrical energy, and an optical scanning device which optically scans the object to be read by oscillating the illuminating light from the light generation device on it in a predetermined direction and also collects the reflected light from the object to be read at the light receiving side of the light receiving device wherein the optical scanning device includes a flat optical scanning member which is formed to have a mirror side that can reflect light; multiple flat light receiving members, each of which has a mirror side that can reflect light, that surround the flat optical scanning member; a supporting device which supports the flat optical scanning member and the multiple flat light receiving members on a stationary base so that each mirror side faces outwards and so that they can be displaced in one or two-dimensional directions; a driving device that displaces each flat member in one or two-dimensional directions; and a controlling device which displaces, through the driving device, the flat scanning member in the predetermined scanning direction to perform optical scanning and also displaces, in synchronicity with the optical scanning by the flat optical scanning member, each of the multiple flat light receiving member to gather reflected light on the light receiving side of the light receiving device.

In this way, a light generation device generates an illuminating light to illuminate an object to be read and a light receiving device receives the light which is reflected by the object that was illuminated with the illuminating light, and converts it to electrical energy. In addition, the optical scanning device optically scans the object to be read by oscillating the irradiation light from the light generation device in a predetermined direction while collecting the reflected light from the object to be read on the light receiving surface of the light receiving device. For this purpose, an electrical signal that corresponds to the optical information on the object to be read is outputted by the light receiving device and therefore, the optical information can be read from this signal.

Also, according to this aspect of the invention, the optical scanning device includes the flat optical scanning member, one side of which is a mirrored side that can reflect light, and the multiple flat light receiving members placed around the flat optical scanning member, each of which also has a mirror side that can reflect light. These flat members are supported on the fixed base using the supporting device so that their mirror sides are facing outwardly with displacements in one or two-dimensional directions possible, and that they are displaced in one or two-dimensional directions through an electrostatic or magnetic force generated by the driving device. Also, in this invention, the controlling device performs the optical scanning by displacing the optical scanning member using the driving device in a predetermined direction and collects the reflected light from the object on the light receiving surface of the light receiving device.

In other words, the optical scanning apparatus according to this aspect of the invention does not integrate, as in the conventional apparatus, the reflecting mirror parts for optical scanning and light receiving nor rotate this integrated mirror part synchronously with the rotation of the motor; instead, the reflecting mirror part is divided into the flat optical scanning member and the multiple flat light receiving parts and the optical scanning and the collection of the reflected light is performed by displacing these parts individually through electrostatic or magnetic force.

Therefore, for the optical scanning apparatus according to this aspect of the invention, there should be individual supporting devices which enable the reflective mirror part to be displaced for supporting each of the flat parts and with these, the load that is applied to the supporting device is much smaller compared to that of the rotation axis of the conventional optical scanning apparatus. Because of this, even if shocks are received from the outside, the application of shock loads to the supporting device can be prevented and thus, shock and vibration resistance is improved.

In addition, each of the flat parts are much lighter than the conventional reflecting mirror part and moreover, since the flat parts are displaced through electrostatic or magnetic force, the driving device can displace each of the flat parts at high speeds.

In short, as the driving device for optical scanning, unlike in the conventional apparatus in which a motor is used and the properties of the motor itself make it impossible to perform optical scanning at high rates of several kHZ, the driving device according to one aspect of this invention displaces each of the flat parts through electromagnetic or electrostatic force which is produced, e.g., by rapidly applying an electrical voltage between electrodes to energize a solenoid or the like, and moreover, since each of the flat parts are much lighter than the integrated mirror part assembly and these parts are displaced rapidly by the driving device through electrostatic or electromagnetic force, the optical scanning apparatus according to this aspect of the invention can displace each of the flat parts at high rates of several kHz.

Also, for this invention, since the flat members are displaced through electrostatic or electromagnetic force, each of the flat members can be displaced in either one-dimensional or two-dimensional directions by adjusting the positions where the supporting device supports each of the flat members and the positions where the driving device applies the electrostatic or electromagnetic force on the flat members. Therefore, according to the optical scanning apparatus of this invention, unlike the conventional apparatus where the optical scanning direction is limited to the one-dimensional direction that corresponds to the rotational direction of the motor, the range of uses of the optical scanning apparatus is widened.

Also, according to another aspect of this invention, each of the flat members is integrated with the stationary base and the supporting device using an inorganic material that has elastic properties.

In this way, the flat optical scanning part and the multiple flat light receiving parts are integrated with the stationary base and the supporting device through an inorganic material that has elastic properties.

For this purpose, each of the flat parts can be secured more firmly on the stationary base than in the case when the stationary base, the supporting device and the flat parts are combined after forming each separately, and thus, shock and vibration resistance improve. Also, since there is no need to assemble the parts, then ease of manufacture improves.

Moreover, according to a further aspect of the present invention, the controlling device includes a storage device to store relative displacement amounts of each of the flat light receiving members for focusing the mirrored side of each of the flat light receiving members on a predetermined point, a control signal generation device to generate a control signal for displacing the flat optical scanning member in the optical scanning direction, and a driving control device to displace the flat optical scanning member based on the control signal from the control signal generation device and also to displace each of the flat light receiving parts based on the control signals that were compensated by the relative displacement amounts that were stored by the storage device.

In this way, the system includes the control signal generation device and the driving control device in which the driving control device displaces the flat optical scanning member based on the control signal for optical scanning outputted by the control signal generation device while displacing each of the flat light receiving members based on the same control signal that is compensated by the relative displacement amounts of each of the light receiving parts which are stored by the storage device.

In short, in order to gather the reflected light on the light receiving side of the light receiving device using the multiple flat light-receiving members, the focal points of each mirror side of each of the light-receiving members should be focused on a predetermined location and moreover, the displacement of such location is determined according to the position of the reflected light from the object that is being optically scanned. Therefore, in order to collect reflected light on the light receiving surface of the light receiving device using each of the light receiving members, a controlling amount for each of the flat light-receiving members which corresponds to the optical scanning direction from the flat optical scanning member is determined and the flat light receiving member should be displaced in correspondence with this amount. However, if the controlling amount is computed for each of the flat light-receiving part every time, then the computations would take time and thus, high-speed optical scanning could not be realized.

For this purpose, in this aspect of the invention, the relative displacement amount, which is for focusing all the focal points of each of the flat light receiving members on a predetermined position for each light receiving member is stored beforehand by the storage device and using this relative controlling amount, each light receiving member is displaced by compensating the controlling signals for displacing the optical scanning member. Thus, according to this aspect of the invention, the computation process for the collection of the reflected light using the controlling device is simplified and high-speed optical scanning is possible.

According to a still further aspect of the present invention, the storage device includes a voltage dividing resistor that partially divides the control signal from the control signal generation device by a predetermined partial division ratio, and a driving control device that displaces each of the flat light receiving members responsive to the partially divided signal which is the control signal that was partially divided by the partial division resistor.

In this way, the storage device includes the voltage divider which adjusts the control signal which is outputted by the control signal device for optical scanning at a predetermined ratio and for the driving control device, each of the flat light receiving members are displaced using the control signal for optical scanning that was adjusted by the potential divider. In other words, for this invention, by setting the relative displacement values of each of the light receiving members as the ratio for the potential divider beforehand, the control signal is compensated directly by the potential divider and this compensated control signal (in short, the divided voltage of each part of the potential divider) is used as the control signal of the flat light receiving member. Thus, according to this invention, the computation procedure for collecting the reflected light in the controlling device is simplified, optical scanning can be accomplished at high-speed and moreover, can be implemented with a simple circuit construction.

According to yet another aspect of the present invention, a side of the each of the multiple flat light receiving members is a light receiving device instead of a mirrored surface.

In this way, by making one side of each of the multiple flat light receiving members a light receiving element side instead of a mirror side, the flat light receiving members are made to function not as the reflecting mirrors for collecting the reflected light; rather, they can receive reflected light from the object to be read directly. For this purpose, with this invention, there is no need to form light paths from each of the light receiving members to the light receiving device and thus, miniaturization of the optical scanning apparatus is possible.

According to another aspect of the present invention, a side of the flat optical scanning member is a light generating device instead of a mirror.

In this way, by making one side of the flat optical scanning member a light generating side instead of a mirror side, the flat optical scanning member does not function as the reflecting mirror for optical scanning; rather, the illuminating light is made to be generated directly from one side of the flat optical scanning member. Accordingly, with this invention, there is no need to form a light path from the light generation device to the flat optical scanning member and thus, the miniaturization of the optical scanning apparatus is realized.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENT

The embodiments of this invention are explained below with the use of related figures.

Figure 2:
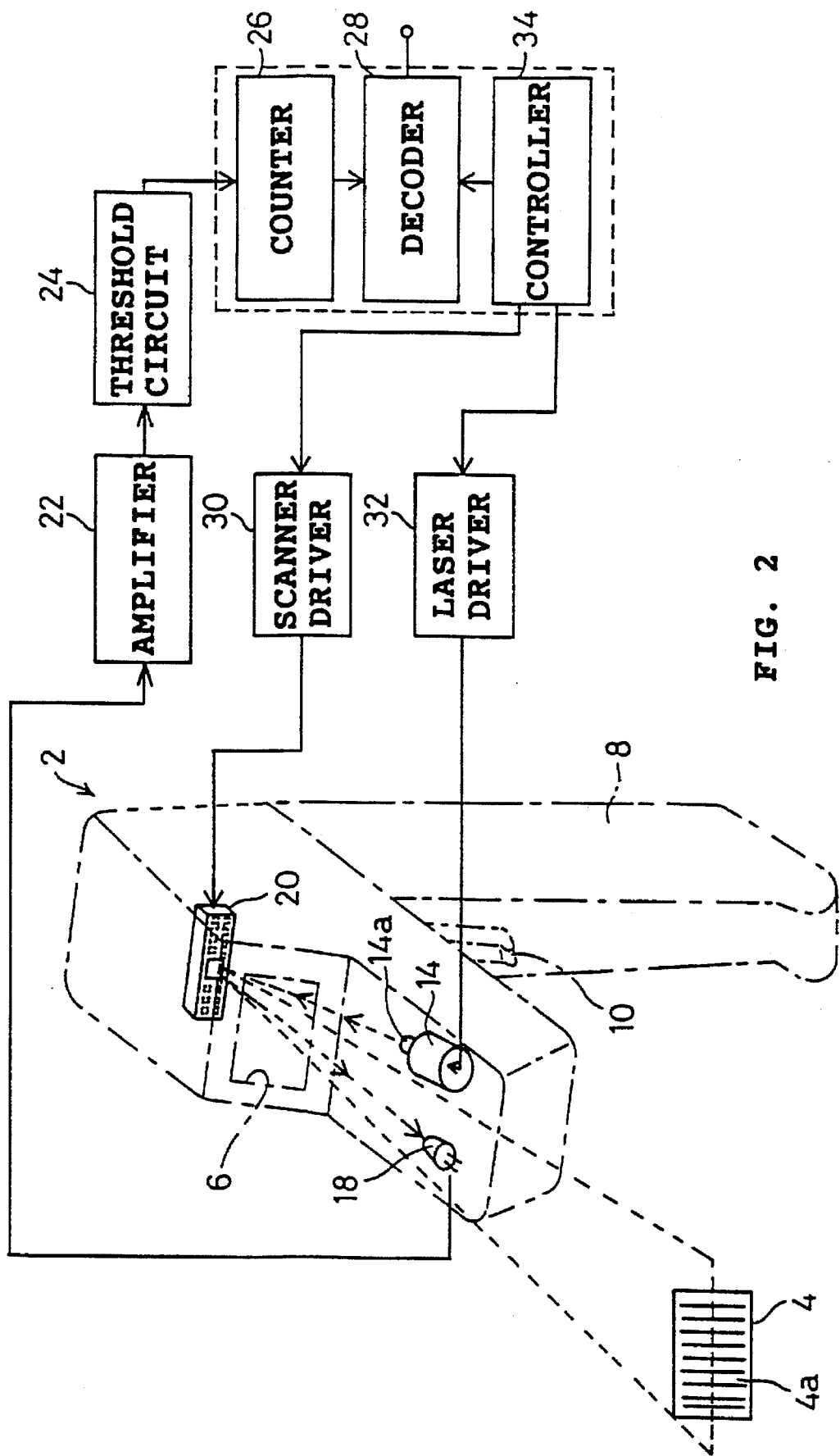
FIG. 2 is a block diagram of the overall construction of a bar code reader according to the first embodiment.

FIG. 2 is a schematic diagram of an entire bar code reader according to a preferred embodiment of this invention.

As shown in FIG. 2, light (preferably, laser light) for reading a bar code 4a written on a bar code label 4 is emitted through a window 6, which is also used for inputting the reflected light to the interior, formed at an upper side of the body of the bar code reader 2 of this embodiment. Also, a grip 8 for holding the reader 2 and a switch 10 at its neck for activating the reader 2 to read the bar code 4a are disposed at a lower side of the body of the bar code reader 2. In short, the bar code reader of this embodiment is of the so-called portable type.

Next, the interior of the bar code reader 2 includes a laser light source 14 which emits laser light as parallel light beams through a collimating lens 14a, a light receiving element 18, which receives light reflected by the bar code label 4 and converts it into an electrical signal, and a scanner 20, which optically scans the bar code label 4 by oscillating the laser light emitted by the laser light source 14 in a predetermined direction and which directs the reflected light from the bar code label 4 that is being optically scanned to the light receiving element 18.

In addition, there is a built-in circuit board in the interior of the body of the bar code reader 2 on which the various circuits for driving the laser light source 14 and the scanner 20, for processing the light receiving signal from the light receiving element 18 and for decoding the bar code 4a have been mounted.

In other words, the interior of the body of the bar code reader 2 includes an amplifier 22 which amplifies the weak light receiving signal from the light receiving element 18, a threshold circuit 24 which converts the amplified light receiving signal outputted by the amplifier circuit 22 into a binary signal, a counter 26 which counts transitions of the binary signals outputted by the threshold circuit 24, a decoder 28 which decodes the bar code based on the count results and outputs the decoded result, a scanner driver 30 which drives the scanner 20, a laser driver 32 which drives the laser light source 14 to emit the laser light and a controller which controls the operations of the decoder. It must be noted that the counter 26, the decoder 28 and the controller 34 are preferably implemented in a microprocessor unit that has a CPU, ROM, RAM and the like.

Also, as shown in FIG. 1, in the scanner 20 of this embodiment an approximately 4 mm. square optical scanning mirror 40 and, on each side thereof, multiple (in this embodiment, 4 pieces per column and 5 pieces per row for a total of 20 pieces) approximately 2 mm. square light receiving mirrors 50 have been disposed. Each of these mirrors 40, 50 is contained inside a package 42 and is protected by a transparent optical material 44 which is made of glass or the like.

Figure 3A:
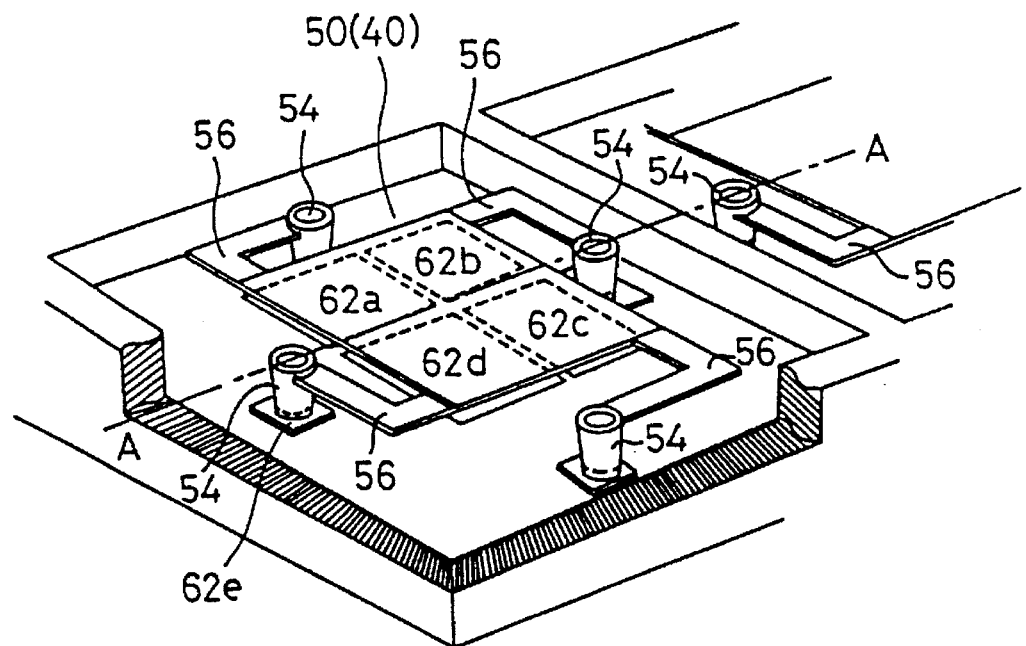
FIGS. 3A-3C are diagrams showing the construction of a mirror of the scanner of the first embodiment.
Figure 3B:
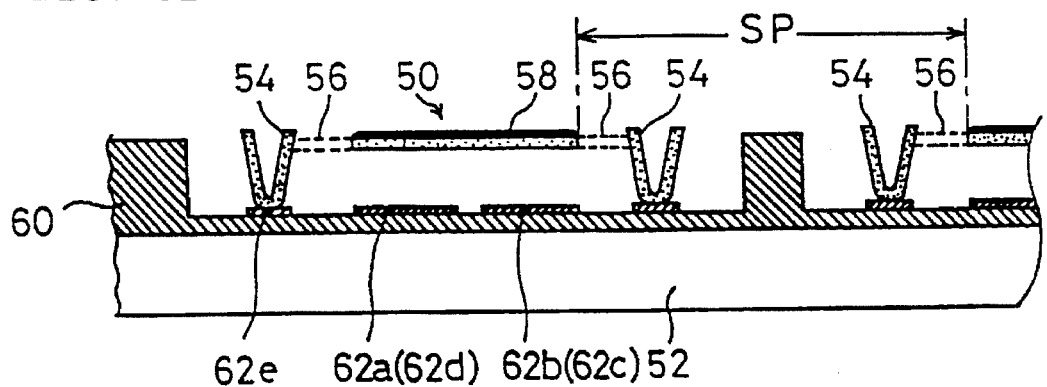

Also, as shown in FIGS. 3A and 3B, these mirrors 40, 50 are disposed on a substrate 52 which acts as a stationary base and made of silicon resin or the like. The mirrors 40, 50 are disposed at predetermined intervals SP (in this embodiment, approximately 2 mm.) using columns 54 and four flat beams 56, which are the supports that protrude from the columns 54, and are provided on the base 52. In addition, the four flat beams 56 protrude from the columns 54 to the sides of each of the mirrors 40, 50, and the ends of the beams 56 are connected to the four corners of each of the mirrors 40, 50. Accordingly, if one of the mirrors 40, 50 receives an external force, each of the corresponding beams would bend and each of the mirrors 40, 50 would be displaced in a two-dimensional direction that corresponds to that external force. In short, each of the beams 56 acts as a twisting spring element (also known as a torsion bar) that supports its respective mirror 40, 50 to be displaced in a two-dimensional direction. Then, a mirror surface 58 is formed at the surface of each of the mirrors 40, 50 opposite the substrate 52 through aluminum deposition or an equivalent technique.

On the other hand, an insulating layer 60 is built up at the side of the substrate 52 proximate the mirrors 40, 50 and for each mirror 40, 50, four electrodes 62a, 62b, 62c, 62d are provided which divide the surface facing the corresponding mirror into four parts. Also, at the lower part of each of the beams 54, a ground electrode 62e, which grounds the mirrors 40, 50 and which passes through the column 54 and the beam 56, is formed. In short, each column 54 and its respective beam 56 are in electrical contact with its respective mirror and each of the mirrors 40, 50 is grounded through corresponding ground electrodes 62e. Also, the four electrodes 62a~62e provided for each of the mirrors 40, 50 are externally connected through the drop line 64 (shown in FIG. 3C).

Figure 1A:
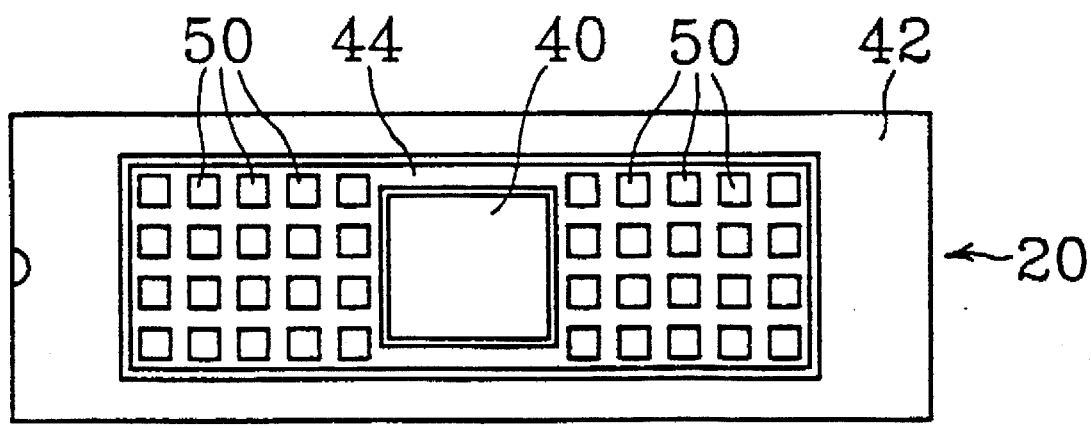
FIGS. 1A and 1B are block diagrams of the overall construction of a scanner according to an embodiment of the present invention.
Figure 1B:
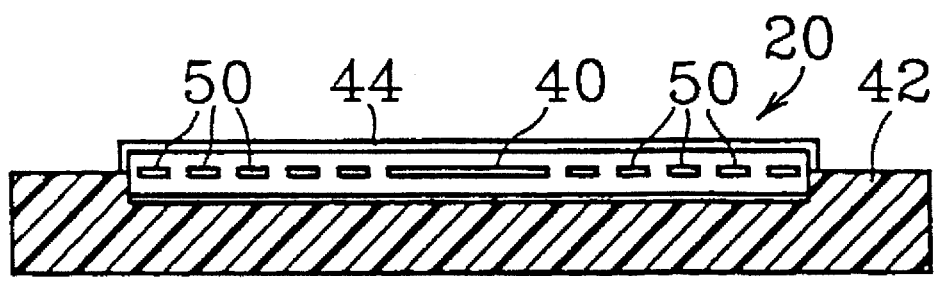
Figure 3C:
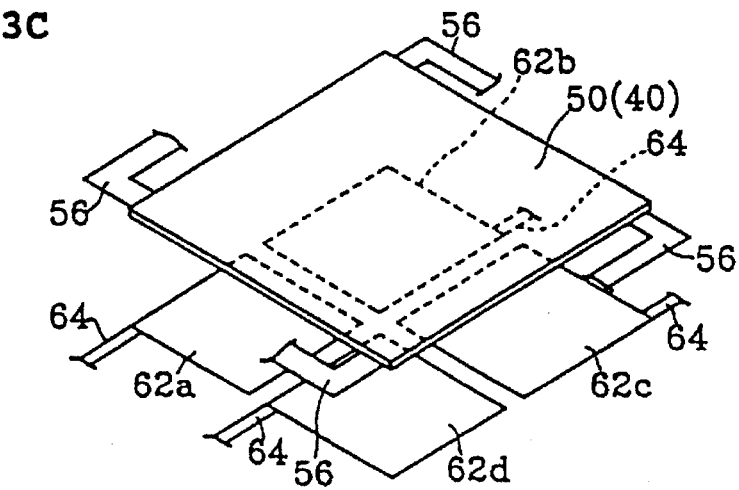

FIG. 1 shows the whole structure of the scanner 20. FIG. 1A is an elevated view of the scanner 20 as seen from the laser light source 14 and the light receiving element 18 sides while FIG. 1B is its cross-sectional view. In addition, FIGS. 3A-3C show enlarged views of the structure of the light receiving mirror (it must be noted that while bigger in size, the optical scanning mirror also has the same structure); FIG. 3A is a schematic perspective view of its structure, while FIG. 3B is a cross-sectional view along the 3B—3B line in FIG. 3A. FIG. 3C shows an explanatory view of the physical relationship between the mirror 40 and the electrodes 62a~62d. Each of these drawings intend to make clear the structure of each part of the scanner 20; however, they do not correspond to actual measurements of each of the parts.

Also, for this embodiment, while the scanner 20 is integrated with the substrate 52 using a semiconductor production process that is used in the formation of semiconductor integrated circuits, the formation process of this structure is explained in detail in Japanese Patent Laid-Open Publication No. Hei 3-209208 (incorporated herein by reference), and because this process is commonly known, explanations of it are omitted here.

For the scanner 20 formed as described above, if electrical voltage is applied between the four electrodes 62a~62d and the ground electrode 62e, then an electrostatic force that corresponds to the applied voltage is generated between the electrodes 62a~62d where the voltage was applied and the mirrors 40, 50 facing these electrodes; thus, the mirrors 40, 50 are displaced due to this electrostatic force. Thus, by controlling the electrical voltage applied to the electrodes 62a~62d of each of the mirrors 40, 50 through the operations of the controller 34 and the scanner driver 30, the mirrors 40, 50 can be displaced to permit optical scanning and the receiving of the reflected light.

The operation and the driving mechanism of the scanner 20 is explained in detail below. For purposes of simplicity, this explanation assumes that the optical scanning mirror 40 and the multiple light receiving mirrors 50, led by the optical scanning mirror 40, are displaced from left-to-right (in short, in one axial direction) to perform one-dimensional optical scanning.

First, because each of the mirrors 40, 50 is grounded via the ground electrode 62e, the application of electrical voltage to the four electrodes 62a~62d facing each would produce an electrostatic force corresponding to the applied voltage between the mirror and the electrode. Then, since each of the electrodes 62a~62d is fixed to the substrate 52, the mirror will be attracted to the electrode side due to the electrostatic force that was produced. This is widely known as the Coulomb force. Also, since each of the mirrors 40, 50 is supported by the beams 56, the beams are bent by the electrostatic force and thus, each of the mirrors 40, 50 is displaced relative to its initial position. Then, if there is a voltage difference between the voltages applied to each of the electrodes 62a~62d, then each of the mirrors will not be parallel any more to each of the electrodes 62a~62d as well as to the substrate 52.

In short, among these four electrodes 62a~62d, if electrodes 62a and 62d, which are placed at the upper and lower left-hand sides, respectively, and electrodes 62b and 62c, which are placed at the upper and lower right-hand sides, respectively, are considered as two separate pairs, if different voltages are applied to the left side electrodes 62a, 62d and the right side electrodes 62b, 62c, the mirrors 40, 50 would be attracted to the electrode side whose applied voltage differs most with the ground voltage, and the degree of inclination with respect to the substrate 52 would correspond to the difference in the voltage applied.

Therefore, by changing the amount of voltage applied between the pairs of electrodes 62a, 62d and 62b, 62c, each of the mirrors 40, 50 can be oscillated sideways on the substrate 52 and by changing the rate at which the amount of voltage applied is changed, the rate of change in the oscillation movements of each of the mirrors 40, 50, can also be changed. Furthermore, it goes without saying that the application of different voltages to each of the four electrodes 62a~62d would displace each of the mirrors 40, 50 in two-dimensional directions.

Also, since the displacement amounts due to the oscillation movements of the each of the mirrors 40, 50 are proportional to the electrical voltages applied to the electrodes 62a~62d, different amounts of electrical voltages can be applied to each of the electrodes in such a way that those electrodes of the light receiving mirrors 50 that are far from the optical scanning mirror 40 have large voltages applied thereto while those near the optical scanning mirror 40 have small voltages applied thereto, and in doing so, the multiple light receiving mirrors form a concave shape and as with the conventional light receiving mirror that uses a concave mirror, the reflected light from the bar code label 4 can be collected.

Figure 4:
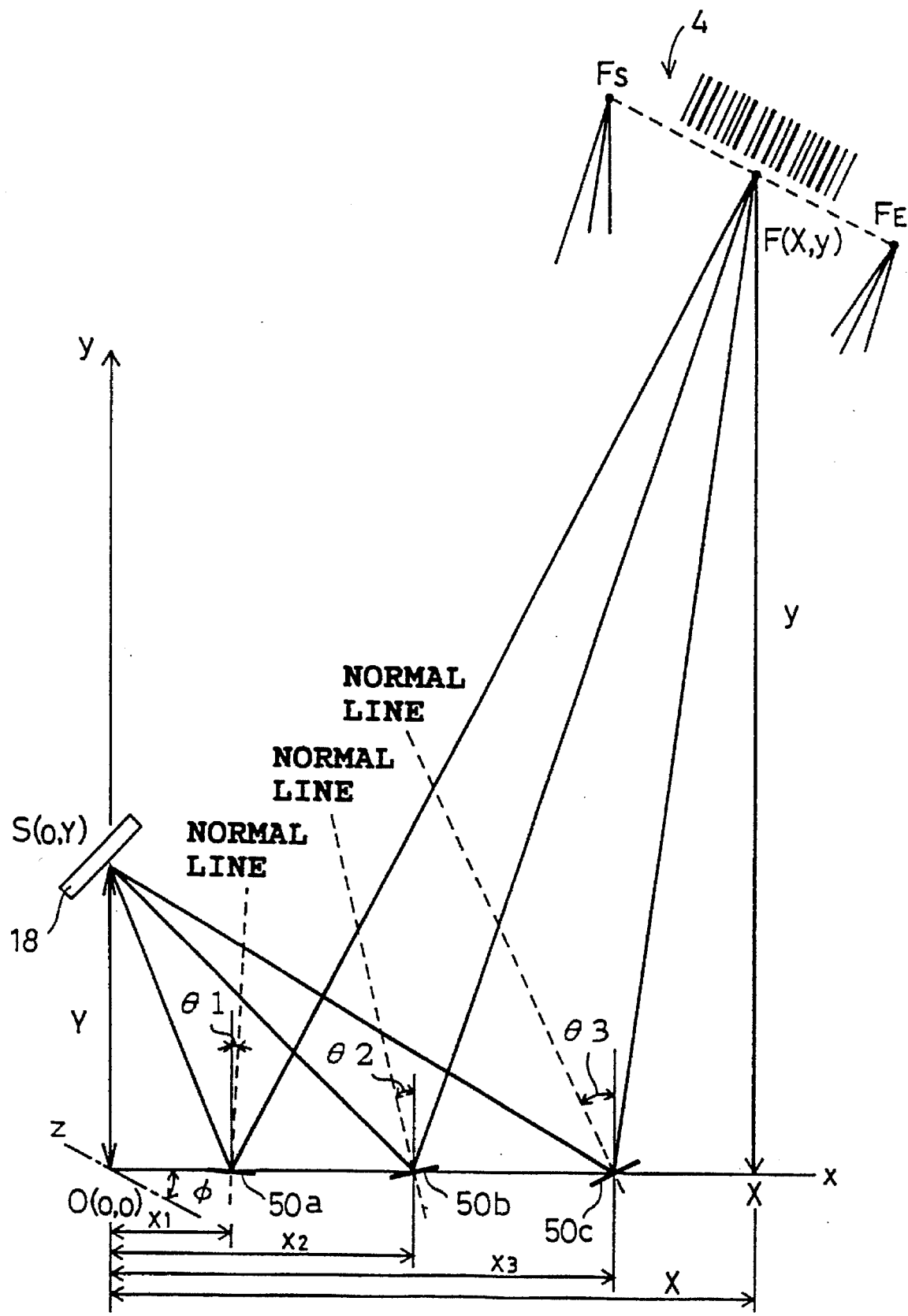
FIG. 4 is a diagram that shows a driving direction for gathering light using a light receiving mirror according to the first embodiment.

Next, referring to the multiple light receiving mirrors 50, FIG. 4 shows the angle of each of the light receiving mirrors 50 when the reflected light from the bar code label 4 is focused on the light receiving element 18.

First, if the light receiving mirrors 50a, 50b, 50c of the scanner 20 lie on the x-axis of the x-y coordinate system and are x1, x2, x3 away from the origin O (0,0), and if the light receiving surface of the light receiving element 18 lies on the y-axis of the x-y coordinate system and is located at a point S (0,Y) that is distance Y away from the origin O (0,0) and if the bar code label 4 is at a point F (X,y) which is X distance away on the x-axis and y distance away on the y-axis from the origin O (0,0), then, using the light receiving mirrors 50a~50c, the angle of the normal line for each of the mirrors 50a~50c with the y-axis is set as θ1, θ2, θ3, respectively, in order to focus the light reflected from the bar code label 4 on the light receiving element 18.

On the other hand, since the bar code 4 has multiple rows of bars and those rows have predetermined lengths, then in order to read the bar code 4a from the bar code label 4, the illumination point on the bar code label 4 is changed sequentially using the optical scanning mirror 40 and there is a need to sequentially change each of the angles of the light receiving mirrors 50a~50c in correspondence with the illumination point on the bar code label 4. In other words, to read the bar code 4 from the bar code label 4a, each of the angles of the light receiving mirrors 50a~50c can be changed for the reflected light to be collected at some certain point between the endpoints FS, FE of the ends of the bar code label 4.

Also, to sequentially gather the reflected light between the points FS, FE, the angle of each of the mirrors 50a, 50b, 50c needs to be changed only by the same amount while keeping the relative angles of each of the mirrors 50a, 50b, 50c as is, and during this time, the displacement amount of each of the mirrors 50a~50c can be defined as the angle φ of scan point along the z-axis relative to the xy-plane with the origin O at its center. In short, if the angles θ1~θ3 are set as the relative angles of the mirrors 50a~50c, then the angle φ is just added to that amount.

Therefore, to read the bar code 4a from the bar code label 4 using the scanner 20 of this embodiment, there is a need to set beforehand the relative angles (the angles θ1~θ3 noted above) of each of the light receiving mirrors 50 for collecting light reflected from the bar code label 4 and during the same time, if the standard angle of each of the light receiving mirrors 50 is compensated accordingly with the control amount of the optical scanning mirror during that time, then the illumination of the bar code label 4 with the laser light and the light receiving of the reflected light can be done accurately while sequentially changing the illumination point (in other words, while performing optical scanning).

The angles θ1~θ3 of each of the light receiving mirrors in FIG. 4 can be expressed as in Eq.(1).

$$\theta = \tan^{-1}\left(\frac{\sqrt{x_\theta^2 + Y^2} \cdot X - (\sqrt{(X-x_\theta)^2 + y^2} + \sqrt{x_\theta^2 + Y^2}) \cdot x_\theta}{\sqrt{x_\theta^2 + Y^2} \cdot y + \sqrt{(X-x_\theta)^2 + y^2} \cdot Y}\right) \quad (1)$$

Figure 5:
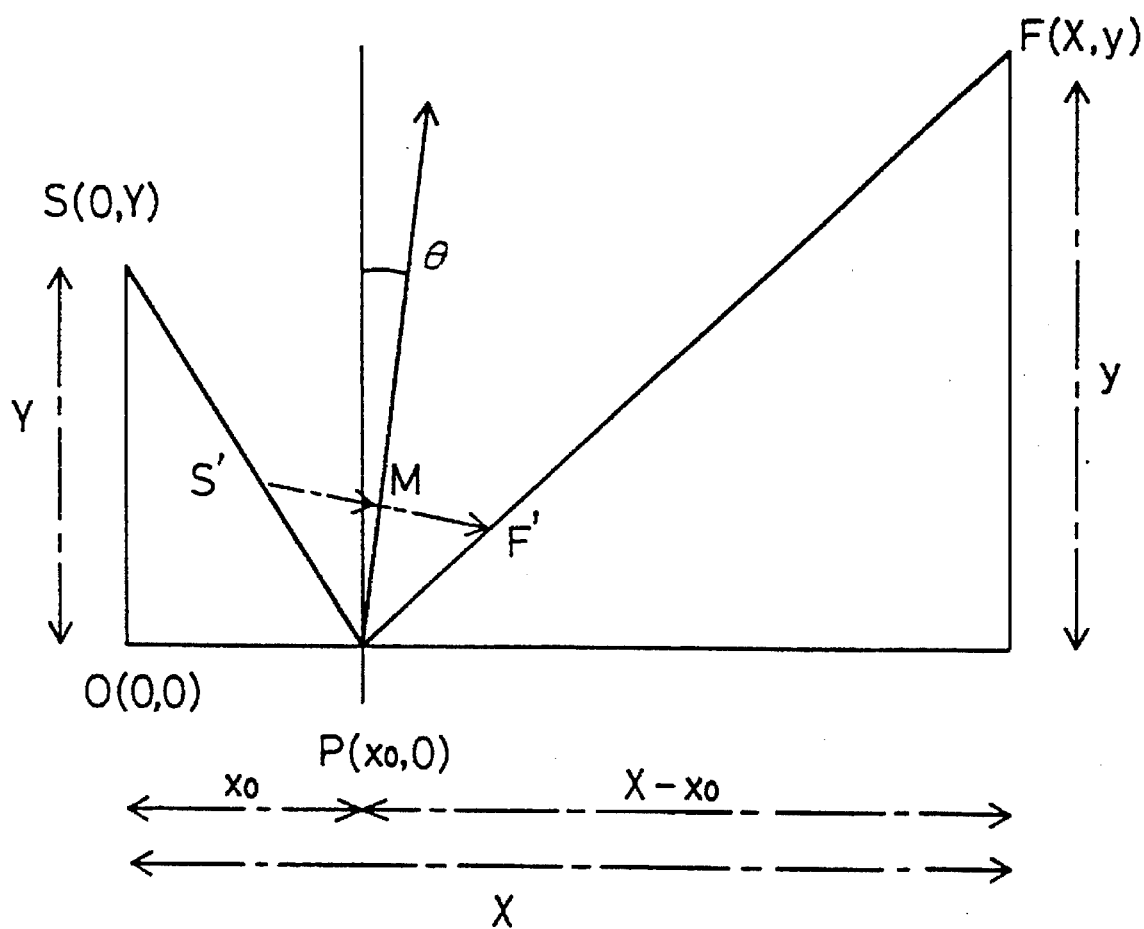
FIG. 5 is a diagram that shows a computation procedure for the displacement angle of the light receiving mirror of the first embodiment.

That is, as shown in FIG. 5, with respect to the origin O (coordinates: 0,0), setting the light receiving location of the reflected light as a point S (coordinates: 0,Y), the illumination location of the laser light on the bar code label 4 as a point F (coordinates: X,y) and the location of the light receiving mirror 50 as a point P (coordinates: $x_0$,0), the angle made by the normal line of the surface of the light receiving mirror 50 with the y-axis is set as θ. For this case, Y is the distance from the origin O to the light receiving element 18, $x_0$ is the distance from the origin O to the light receiving mirror 50, y is the vertical distance from the bar code label 4 to the x-axis and X is the distance from the origin O to the intersection of the x and y axes. X, Y and y are set at certain values according to the physical relationships of the light receiving element 18, the scanner 20 and the bar code label 4 with each other. Therefore, the relationship of each of the multiple light receiving mirrors with the angle θ that is made with the normal line can be expressed clearly.

In other words, the vectors PS and PF and their magnitudes can be expressed as in the Eqs. (2)~(5) below.

$$\vec{PS} = (0, Y) - (x_\theta, 0) = (-x_\theta, Y) \quad (2)$$

$$\vec{PF} = (X, y) - (x_\theta, 0) = (X - x_\theta, y) \quad (3)$$

$$\text{magnitude } |\vec{PS}| = \sqrt{x_\theta^2 + Y^2} \quad (4)$$

$$\text{magnitude } |\vec{PF}| = \sqrt{(X - x_\theta)^2 + y^2} \quad (5)$$

Therefore, from Eqs. (2)~(5), vectors PS' and PF' can be expressed as in Eqs. (6) and (7), respectively, and from Eqs. (6), (7), vector S'F' can be expressed as in Eq. (8).

$$\vec{PS'} = \frac{\vec{PS}}{|\vec{PS}|} = \left( -\frac{x_\theta}{\sqrt{x_\theta^2 + Y^2}}, \frac{Y}{\sqrt{x_\theta^2 + Y^2}} \right) \quad (6)$$

$$\vec{PF'} = \frac{\vec{PF}}{|\vec{PF}|} = \left( \frac{X - x_\theta}{\sqrt{(X - x_\theta)^2 + y^2}}, \frac{y}{\sqrt{(X - x_\theta)^2 + y^2}} \right) \quad (7)$$

$$\vec{S'F'} = \frac{\vec{PF}}{|\vec{PF}|} - \frac{\vec{PS}}{|\vec{PS}|}$$

$$= \left( \frac{X - x_\theta}{\sqrt{(X - x_\theta)^2 + y^2}} + \frac{x_\theta}{\sqrt{x_\theta^2 + Y^2}}, \frac{y}{\sqrt{(X - x_\theta)^2 + y^2}} - \frac{Y}{\sqrt{x_\theta^2 + Y^2}} \right) \quad (8)$$

Accordingly, the PM vector (the normal line vector) can be expressed as in Eq. (9) and the angle θ that the normal line vector of the displacement of the light receiving mirror forms with the line vertical with the X-axis can be expressed as in Eq. (10).

$$\text{normal line vector } \vec{PM} = \vec{PS'} + \frac{1}{2} \vec{S'F'} = \quad (9)$$

$$\left\{ \frac{1}{2} \left( \frac{X - x_\theta}{\sqrt{(X - x_\theta)^2 + y^2}} - \frac{x_\theta}{\sqrt{x_\theta^2 + Y^2}} \right), \frac{1}{2} \left( \frac{y}{\sqrt{(X - x_\theta)^2 + y^2}} + \frac{Y}{\sqrt{x_\theta^2 + Y^2}} \right) \right\}$$

$$\tan\theta = \frac{\sqrt{x_\theta^2 + Y^2} \cdot X - (\sqrt{(X - x_\theta)^2 + y^2} + \sqrt{x_\theta^2 + Y^2}) \cdot x_\theta}{\sqrt{x_\theta^2 + Y^2} \cdot y + \sqrt{(X - x_\theta)^2 + y^2} \cdot Y} \quad (10)$$

Thus, the displacement angle θ of the light receiving mirror 50, which is located at a position $x_0$ away from the origin O, is given by Eq. (1).

For practical purposes, while y is the distance (normally, tens of cm) from the scanner 20 to the bar code label 4, Y is the distance (normally, a few cm) from the scanner 20 to the light receiving element and $x_0$ is the length of the scanner 20 (normally, a few cm), then $x_0$ and Y can be ignored compared to y and thus, the above equations can be approximated by simpler equations.

Also, since the above explanation holds true not only between the light receiving mirror 50, the light receiving element 18 and the bar code label 4, but also between the light receiving mirror 40, the laser light source and the bar code label 4, then Eq. (1) can also be used when displacing the optical scanning mirror 40 when optical scanning is to be performed. However, for this case, it is obvious that Y and $x_0$ in Eq. (1) should correspond to the locations of the laser light source 14 and the optical scanning mirror 40, respectively.

In addition, during the actual operation of the scanner 20, the relative angle of each of the light receiving mirrors is computed with the angle of displacement of the optical scanning mirror 40 as the standard [0] and keeping this relative angle, the optical scanning and light receiving operations can be performed smoothly.

Next, for the case when the light receiving mirror 50 and the optical scanning mirror 40 are to be displaced to the desired angle θ, the actual voltage V to be applied to the electrodes 62a~62d can be set as below.

Figure 6A:
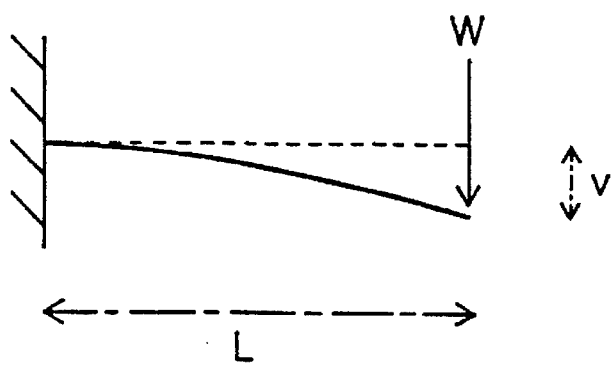
FIGS. 6A-6D are diagrams showing the relationship between the displacement angle of the light receiving mirror of the first embodiment and the electrical voltage applied to the electrode.

First, as shown in FIG. 6A, the relationship of the displacement of the mirrors to the electrostatic force applied thereto is simplified by supporting each of the mirrors 40, 50 by a single beam.

Figure 6B:
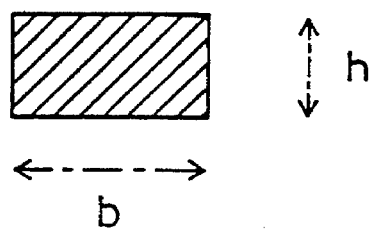

With respect to FIG. 6A, Eq. (11) expresses the relationship for the case when a beam of length L is displaced by a distance v by a force W. For this equation, E denotes Young's modulus [Pa]. In addition, if I denotes the two-dimensional moment [m⁴] of the cross-section and if the cross-section of the beam as shown in FIG. 6B is denoted as b×h, then I can be expressed as in Eq. (12).

$$v = \frac{WL^3}{3EI} \quad (11)$$

$$I = \frac{L}{12} bh^3 \quad (12)$$

Figure 6C:
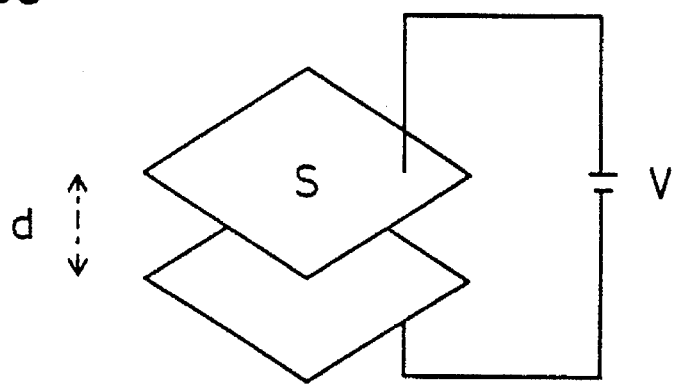

On the other hand, as shown in FIG. 6C, the electrical force F generated when the voltage V is applied between the opposed electrodes is expressed in Eq. (13) with S as the area of the opposed electrodes and d as the distance between the electrodes. In this equation, ε denotes the dielectric constant while $\epsilon_0$ denotes the dielectric constant of a vacuum.

$$F = \frac{1}{2} \epsilon\epsilon_0 S \left( \frac{V}{d} \right)^2 \quad (13)$$

Therefore, if F=W, then from Eqs. (11) and (13), Eq. (14) holds true (however, d is considered small and constant).

$$v = \left( \frac{L^3 \epsilon\epsilon_0 S}{6EId^2} \right) V^2 \quad (14)$$

Figure 6D:
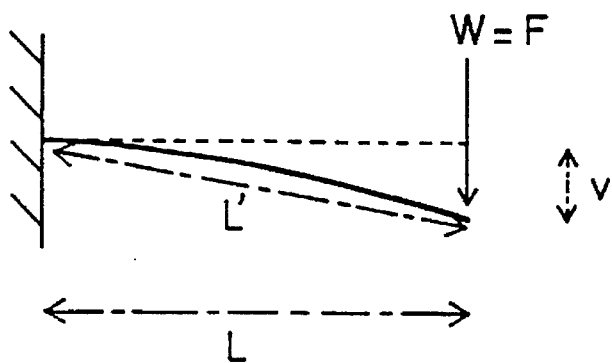

Therefore, as in FIG. 6D, using the single-beamed mirror which is displaced after applying a voltage to the electrodes facing it, if the length of the mirror after displacement L' is set as L'=L because of the minimal displacement amount v, then Eq. (15) expresses the relationship between the angle of displacement θ of the mirror and the displacement amount v and from Eqs. (14) and (15), and Eq. (16), which expresses the relationship between the angle θ and the applied voltage V, is derived.

$$L\sin\theta = v \quad (15)$$

$$\theta = \sin^{-1}\left( \frac{L^2 \epsilon\epsilon_0 S}{6EId^2} \right) V^2 \quad (16)$$

As a result, to perform optical scanning and the light receiving, the voltage to be applied to the electrodes 62a–62d when the light scanning mirror 40 and the multiple light receiving mirrors 50 are displaced to the desired angle θ can be set based on Eq. (16). However, it should be noted that Eq. (16) expresses the relationship between the angle of displacement θ and the voltage applied when one side of the mirror is fixed and since it does not apply to the scanner 20 of this embodiment where each of the mirrors 40, 50 has four electrodes 62a–62d placed opposite it, there is a need to set the actual voltage to be applied in consideration of the number of electrodes, the area of the electrodes, etc.

As in the above, the scanner 20 of this embodiment can perform optical scanning of the bar code label 4 by sequentially changing the voltage applied to the electrodes 62a–62d of the optical scanning mirror 40 and together with this optical scanning, the collection of the reflected light from the bar code label 4 to the light receiving element 18 can be performed by changing the voltage applied to the electrodes 62a–62d of each of the light receiving mirrors. In the following, the structure of the scanner driver 30 and the scanner controller 35, both used for optical scanning and light receiving, are explained using FIG. 7.

While the scanner controller 35 is installed inside the controller 34 shown in FIG. 2 to drive the scanner 20, the counting and computation operations explained below are preferably implemented as a microcomputer process.

Figure 7:
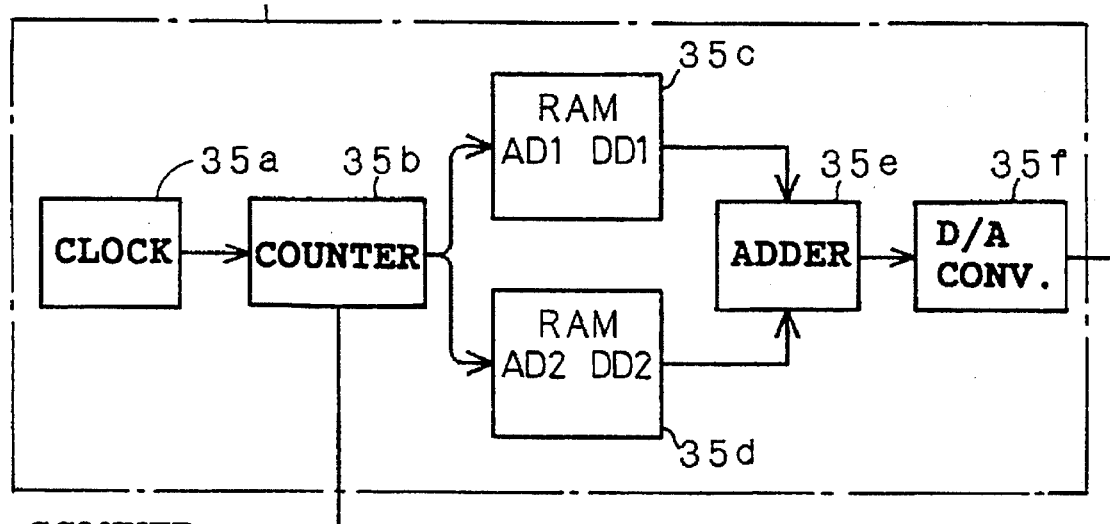
FIG. 7 is a block diagram that shows the construction of a driving system of the scanner of the first embodiment.
Figure 7:
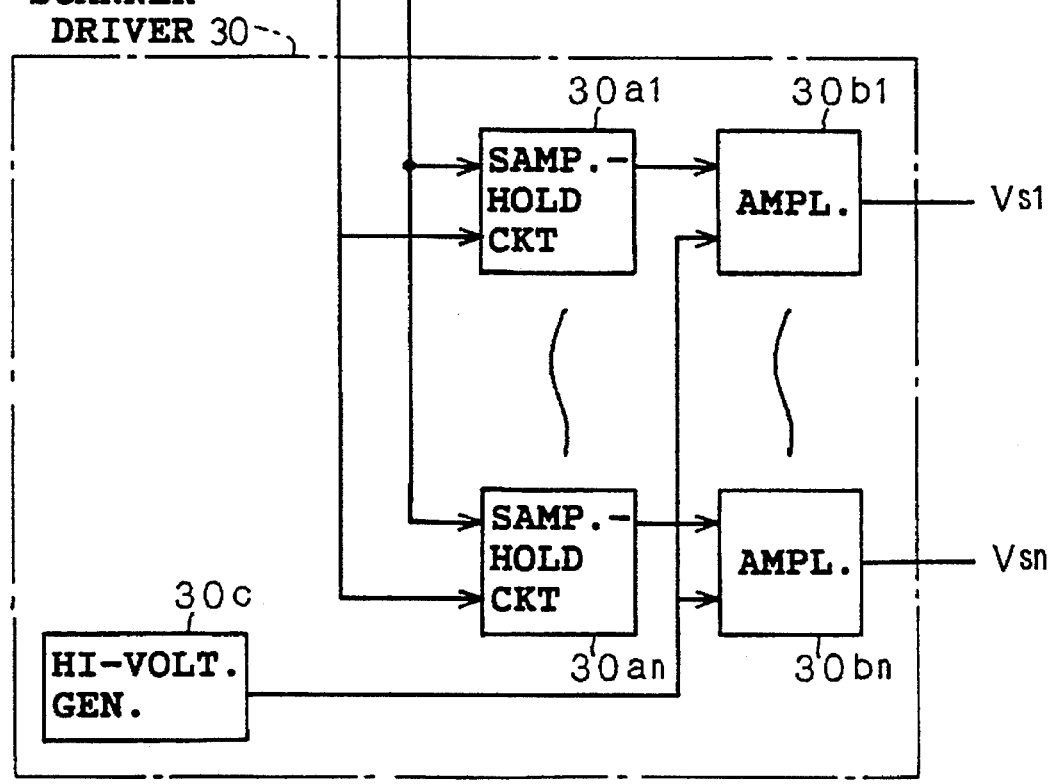

As shown in FIG. 7, a clock 35a, which generates a clock signal of a predetermined frequency (for example, 1 kHz), is provided in the scanner controller 35. The clock from this clock 35a is inputted to a counter 35b and is counted sequentially, and the count values are presented to address terminals AD1, AD2 of RAM 35c and RAM 35d, respectively.

The data which express the voltages that are to be applied to the electrodes 62a–62d of the optical scanning mirror 40 and each of the light receiving mirrors 50 and which correspond to the relative angular displacements of the optical scanning mirror 40 used in directing reflected light to the light receiving element 18 and each of the light receiving mirrors 50 are stored beforehand in the RAM 35c. Then, if RAM 35c receives a count from the counter 35b, it outputs data corresponding to the counter amount sequentially through the data output terminal DD1. These data are the computed values for the voltages that are to be applied to each of the electrodes 62a–62d of each of the mirrors 40, 50 using Eq. (16) and the relative angles of each of the mirrors 40, 50 computed using Eq. (1).

On the other hand, data for sequentially displacing each of the mirror 40, 50 at a predetermined angle are stored in RAM 35d. If RAM 35d receives a counter amount from the counter 35b, it outputs data corresponding to the counter amount sequentially from the data output terminal DD2.

Since these data are for sequentially changing, at a predetermined time interval, the point of illumination of the laser light on the bar code label 4 from one end to the other end of that bar code label 4, then, these data are roughly the same as the amplitude of a sine wave that has been sampled at a predetermined time interval. Also, the RAM 35d outputs the same data until the data of all the electrodes 62a–62d of the scanner 20 stored inside RAM 35c have all been outputted, thereby facilitating synchronized movement of the mirrors 50.

Next, as noted in the above, data that corresponds to the counter amount of the counter 35b is outputted by RAM 35c and RAM 35d and is inputted and added to the adder circuit 35e. The addition result from the adder circuit 35e is inputted to the D/A converter 35f which, in turn, converts it to an analog voltage signal. The analog voltage signal derived after D/A conversion is outputted to the scanner driver 30.

Meanwhile, the scanner driver 30 is made up of n sample-hold circuits 30a1–30an, which correspond to each electrode 62a–62d of each of the mirrors 40, 50 (for this embodiment, there are 41(number of mirrors)×4(number of electrodes)=164 sample-hold circuits), n amplifiers 30b1–30bn which correspond to each of the electrodes 62a–62d of each of the mirrors 40, 50, and the high-voltage generating circuit 30c.

Each of the sample-hold circuits 30a1–30an receives the counter value from the counter 35b inside the scanner controller 35 and sample-holds the electrical signal from the D/A converter 35f every time that value is incremented. Furthermore, it outputs the sample-held electrical signal when the counter value reaches the counter value at which time all the data corresponding to the electrodes 62a–62d of the all the light receiving mirrors 50 have been outputted by the RAM 35c.

Also, these electrical voltage signals outputted by the sample-hold circuits 30a1–30an are amplified to required levels with the high electrical voltage produced by the high-voltage generation circuit 30c serving as a power source and the amplified voltages VS1–VSn are applied simultaneously as the driving voltages of each of the electrodes 62a–62d of each of the mirrors 40, 50.

Meanwhile, for the amplifiers 30b1–30bn, the high electrical voltage from the high-voltage generation circuit 30c is used for amplifying the electrical voltage signals because usually high voltages should be on the order of from tens to hundreds of volts to displace each of the mirrors 40, 50 inside the scanner 20 through electrostatic forces as in this embodiment, and such a separate high-voltage generation circuit 30c is needed to amplify the electrical voltage signal outputted by the sample-hold circuits 30a1–30an to high levels.

In addition, for the sample-hold circuits 30a1–30an, the voltage signal from the scanner controller 35 is sampled sequentially and after sampling, all the voltage signals are outputted simultaneously because the timing of the optical scanning by the optical scanning mirror 40 and the timing of the gathering of the reflected light through each of the light receiving mirrors 50 will be out of step with each other if each of the mirrors 40, 50 of the scanner 20 is displaced successively and as a result, each of the light receiving mirrors 50 will not be able to direct reflected light to the light receiving element 18 satisfactorily. In short, for this embodiment, the timing for driving the optical scanning mirror 40 and the timing for driving each of the light receiving mirrors 50 are not just simply synchronized but, moreover are simultaneous to improve not only the precision of positioning the reflected light on the light receiving element 18 but also the precision of reading the bar code label 4a.

As explained above, for the bar code reader 2 of this embodiment, the scanner 20 for optical scanning and for light receiving is equipped with the optical scanning mirror 40, which is supported by four beams that enable it to be displaced in two-dimensional directions, and the multiple light receiving mirrors 50, which are placed around the optical scanning mirror 40 and which are supported by four beams like the optical scanning mirror 40 to enable them to be displaced in two-dimensional directions, with each of the mirrors 40, 50 displaced in one or two-dimensional directions by applying electrical voltages to the four electrodes 62a–62d placed opposite to each of the mirrors 40, 50.

Also, in driving the scanner 20, the scanner controller 35 generates successive electric voltage signals that correspond to the electrical voltage signals applied to each of the electrodes 62a~62d of each of the mirrors 40, 50 and the scanner driver 30 successively sample-holds these electrical voltages. When the electrical voltage signals for all the electrodes are all present, then it applies high-voltage signals VS1~VSn, which correspond to those voltages, to the electrodes 62a~62d to displace each of the mirrors 40, 50 at each designated time interval simultaneously.

Figure 8C:
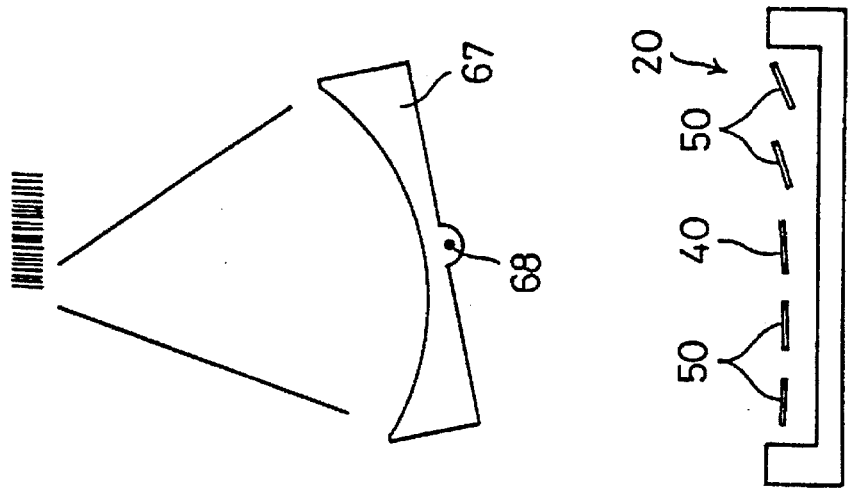
FIGS. 8A-8C are diagrams that compare the operations of a conventional optical scanning apparatus and the optical scanning apparatus of the embodiment.
Figure 8B:
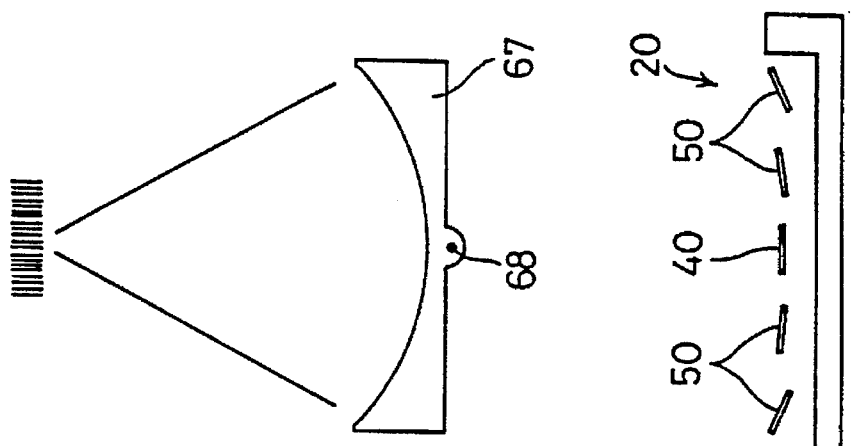
Figure 8A:
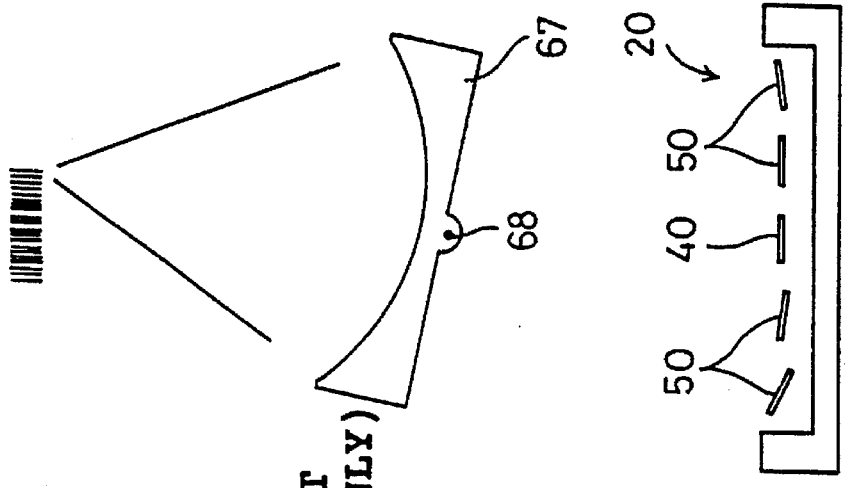

As shown in FIGS. 8A~8C, unlike the conventional optical scanner, the scanner 20 according to this embodiment has no big reflecting mirror 67 for optical scanning that needs to be rotated with the support of the motor's rotation axis 68 and compared to the conventional apparatus, high-speed optical scanning and light receiving can be performed by displacing each of the mirrors 40, 50 which were formed by the multiple partitioning of the big reflecting mirror using electrostatic force.

Moreover, since each mirror is much lighter compared to the reflective mirror 67 of the conventional apparatus, the load applied to the beams 56, which act as supports, and to the supporting columns 54 are small compared to the load that is applied to the rotational axis 68 of the motor of the conventional apparatus and thus, even if external shock is received, big shock loads are not passed on to these supports and thus, shock and vibration resistance improves.

Furthermore, each of the mirrors 40, 50 can be displaced in two-dimensional directions as well as in one-dimensional directions as in the conventional apparatus because the scanner 20 of this embodiment provides four electrodes for each of the mirrors 40, 50 as electrodes for displacing each mirror 40, 50 using electrostatic power. Thus, optical information can be read from objects which have optical information written on them in two-dimensional directions like bar code labels with multiple bar codes arranged on them and thus, the scope of use of the device is widened.

Also, for this embodiment, because each of the mirrors 40, 50 for optical scanning and light receiving are formed integrally with the substrate 52, the beams 56, the supporting columns 54 and the like through the use of a semiconductor production process, each of the mirrors 40, 50 can be fixed more firmly on the substrate 52 than in the case when each part is connected to each other after forming them separately and thus, shock and vibration resistance is improved. Also, since there is no need to assemble these parts, ease of manufacture improves.

Also, in the scanner controller 35 of this embodiment, the data for controlling the relative angles of each of the mirrors 40, 50 to angles that can gather the reflected light and the data for sequentially displacing each of the mirrors 40, 50 for optical scanning are stored beforehand in RAM 35c and RAM 35d, respectively, and because each of the mirrors 40, 50 are driven based on the data which results from adding these stored data, then there is no need to store separate data for optical scanning and for light receiving for each of the electrodes 62a~62d of each of the mirrors 40, 50 and thus, the amount of data to be stored decreases along with the necessary capacity of the RAM storage elements and the like.

Figure 9A:
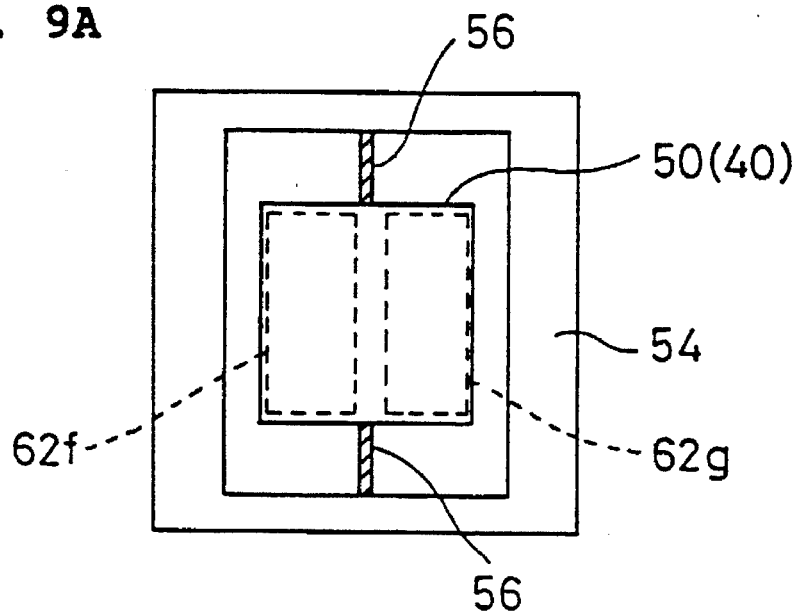
FIG. 9A is a diagram that shows the physical relationship between the mirror of the scanner that is used when optical scanning is performed only in one-dimensional directions in the second embodiment and the electrode.

For the embodiment described above, while the four corners of each mirror 40, 50 have been made to be supported with beams at each corner and while each mirror 40, 50 is provided with four electrodes to enable their displacement in two-dimensional directions, in the case of the one-dimensional displacement of each of the mirrors 40, 50, as shown in FIG. 9A, two opposite sides of each of the mirrors 40, 50 are supported at approximately their centers through two beams 56 and furthermore, the surfaces opposite each of the mirrors 40, 50 on the base are provided with two electrodes 62f, 62g which have been divided by the center line that connects the supports for each of the mirrors 40, 50 that is supported by two beams 56, and one-dimensional displacement can be performed by applying different voltages between each of the electrodes 62f, 62g and the mirror.

Figure 9B:
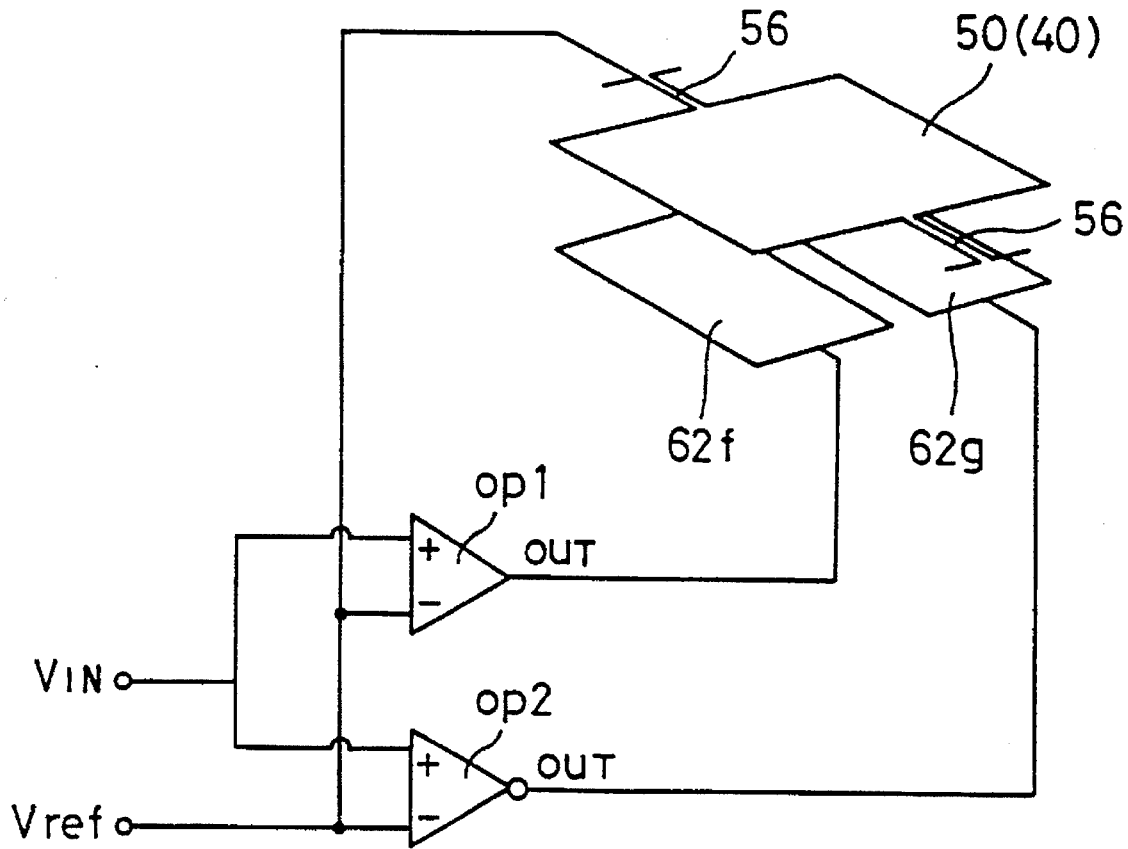
FIG. 9B shows the driver for the scanner according to the second embodiment.

Then, for this case, as shown in FIG. 9B, using two operational amplifiers OP1 and OP2, the input voltage VIN is converted to two voltages—positive and negative with the voltage to be applied to the mirror Vref (Vref can be the ground voltage as in the above embodiment) serving as the standard, and applying these voltages to each of the electrodes 62f, 62g, each of the mirrors 40, 50 can be displaced at a voltage twice that of the input voltage VIN and thus, if the displacement angles of each of the mirrors 40, 50 are set to be the same, then, compared to applying voltage to only one electrode in order to displace each of the mirrors 40, 50, the driving voltage needed can be halved. For the circuit of FIG. 9B, operational amplifier OP1 outputs a positive voltage when the standard voltage is subtracted from the input voltage VIN while operational amplifier OP2 outputs the negative voltage when the input voltage is subtracted from a input voltage VIN, and these voltages are applied to the electrodes 62f, 62g.

In addition, for this embodiment, the voltage that corresponds to the angular displacement of each of the mirrors 40, 50 can be set as the input voltage VIN and in producing this input voltage VIN, as the data for regularly controlling the relative angular displacements of each of the mirrors 40, 50, there is no need to store data that expresses the voltage to be applied to each of the electrodes 62a~62d of each of the mirrors 40, 50. Instead, the relative angular amounts for each mirror 40, 50 derived from Eq. (1) is stored as is in RAM 35c. Also, the number of sample-hold circuits 30a and amplifiers 30b for the scanner driver 30 provided is only as many as the number of mirrors.

Therefore, for the case when each of the mirrors 40, 50 are to be displaced in only one-dimensional directions, the use of a differential driver as shown in FIG. 9A enables the simplification of the constructions of the scanner controller 35 and the scanner driver 30.

Figure 10:
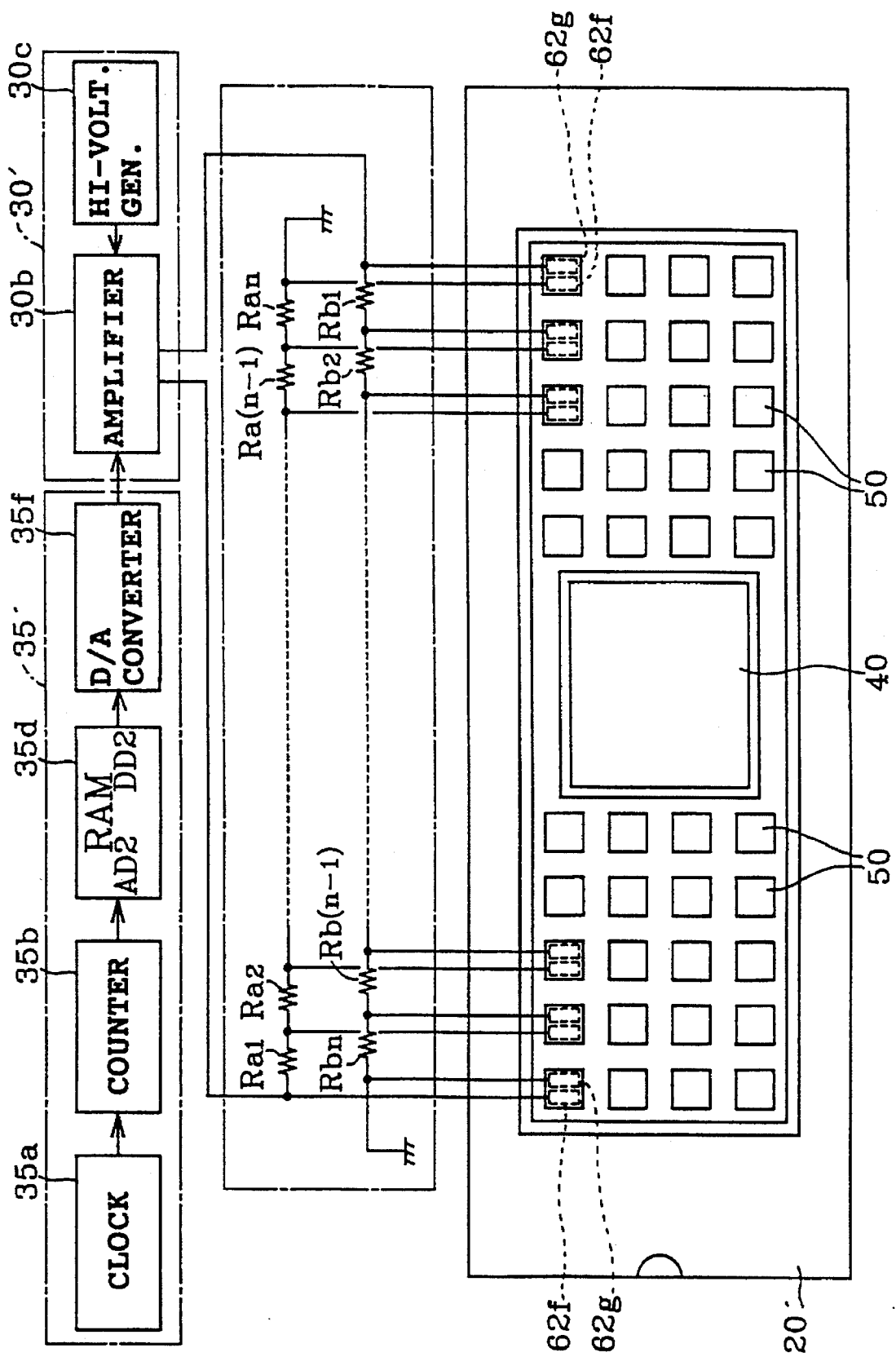
FIG. 10 is a diagram that shows the circuit construction of a driver according to the present invention when a set of resistors for voltage division are used for driving the scanner according to the second embodiment.
Figure 11:
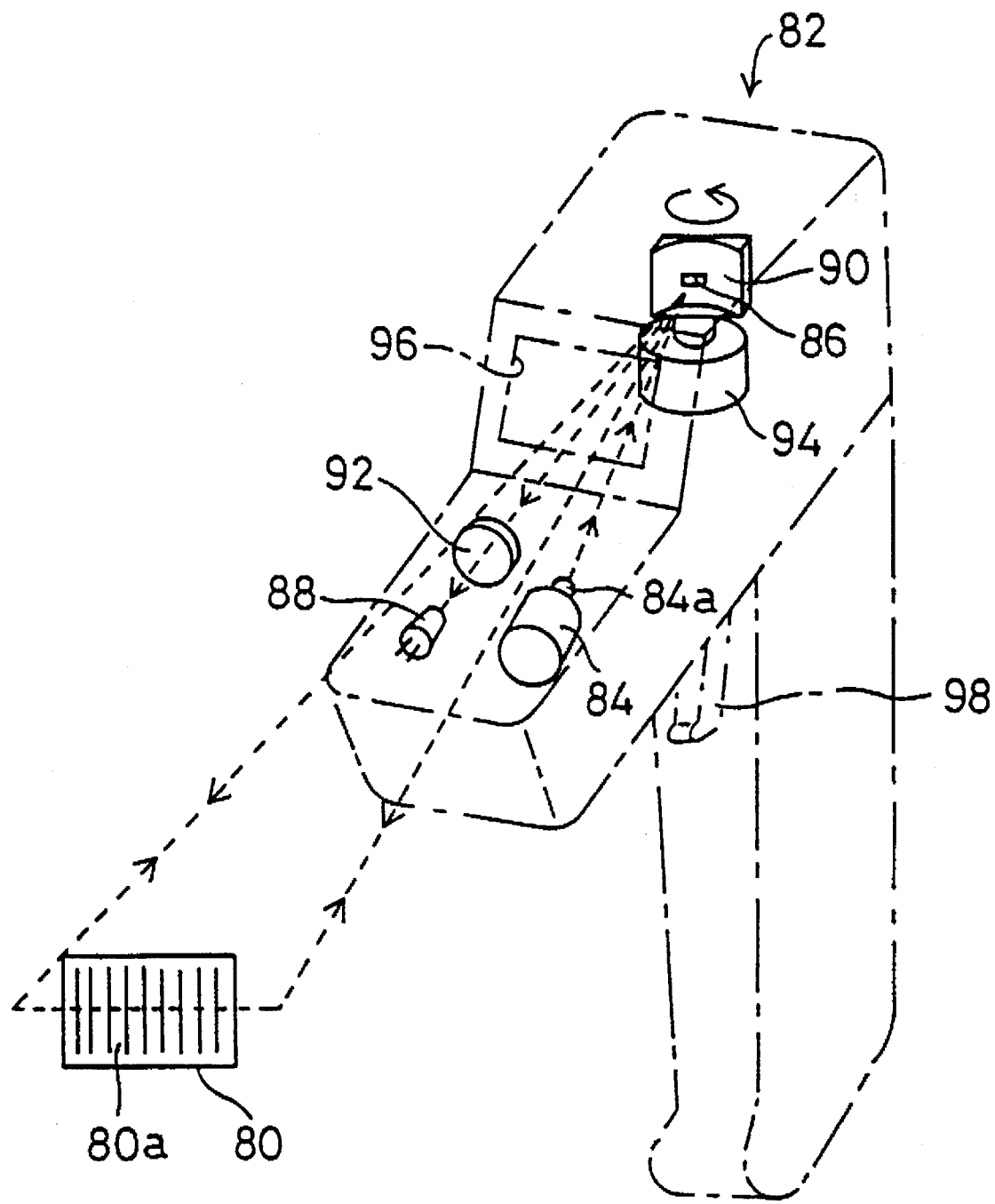
FIG. 11 is a diagram showing an optical scanner according to the prior art.

Next, for the above embodiment, by storing the data for controlling the relative angles of each of the mirrors 40, 50 inside the RAM 35c to enable the gathering of reflected light and by adding these data to the data for optical scanning, the structure that produces driving signals (in short, the voltages that are applied to each of the electrodes) for each of the light receiving mirrors has been derived. Furthermore, as shown in FIG. 10, wherein the data for setting the relative angles of each of the mirrors 40, 50 to the angle that will enable the gathering of reflected light, a voltage divider is formed beforehand by a set of resistors Ra1~Ran and Rb1~Rbn and the driving voltage is applied to these sets of resistors Ra1~Ran and Rb1~Rbn, wherein the voltage to be applied to each electrode of each of the mirrors 40, 50 is produced from the voltage division points of the set of resistors Ra1~Ran and Rb1~Rbn.

Then, with this kind of construction, there is no need for RAM 35c and the adder circuit 35e in the scanner controller 35' and the sample-hold circuit 30a in the scanner driver 30a, then, the circuit construction of each part becomes simpler.

Also, for this case, for the scanner controller 35', it will be fine just to perform the D/A conversion of the data stored in RAM 35d for optical scanning at the desired timing for displacing each of the mirrors 40, 50 and for the scanner driver 30', and it will be just fine to output the driving voltage that corresponds to the D/A converted data as is from the amplifier 30b. Therefore, there is no need to provide additional circuitry for the addition and sample holding of data as in the above embodiment and thus, optical scanning as well as light receiving can be performed much faster.

In addition, since the sets of resistors Ra1~Ran and Rb1~Rbn can be formed simply on the circuit board using a semiconductor production process, then they can be integrated with the board which acts as the fixed board for each of the mirrors 40, 50.

Furthermore, similar to the scanner shown in FIG. 9, FIG. 10 shows the circuit for driving the scanner 20', which was formed to displace each of the mirrors 40, 50 only in one-dimensional directions wherein each of the mirrors 40, 50 is provided with a pair of electrodes 62f, 62g, with the clock 35a inside the scanner controller 35', the counter 35b, RAM 35d, D/A converter 35, the amplifier 30b and high-voltage generation circuit 30c inside the scanner driver 30 all operating in a similar way as those in the embodiment described above. Then, for the two sets of resistors Ra1~Ran and Rb1~Rbn, one of the sets Ra1~Ran produces a driving electrical voltage to be applied to one of the electrodes 62f (at the left side of each mirror in the figure) of each of the mirrors 40, 50 while the other set Rb1~Rbn produces a driving voltage to be applied to the other electrode 62g (at the right side of each mirror in the figure) of each of the mirrors 40, 50. Again, for each of the sets of resistors Ra1~Ran and Rb1~Rbn, there is a larger voltage difference between the electrodes 62f-62g as one goes farther from the optical scanning mirror 40 to the light receiving mirror 50 and moreover, to make the polarity of the voltage difference different between the light receiving mirrors that are placed on opposite sides of the optical scanning mirror 40, the driving voltages outputted by the amplifier 30b are applied with polarities different from each other.

While preferred embodiments of this invention have been described above, the invention is not limited to the above embodiments and that it can assume other forms.

For example, while it has been explained for the above embodiments that the relative angles of the optical scanning mirror 40 and the multiple light receiving mirrors 50 can be controlled precisely by controlling the electrical voltages applied to each of the electrodes, in reality, there are cases when the reflected light from the bar code label 4 cannot be directed to the light receiving element 18 because of the varying production conditions for the scanner 20, control errors in the driving system and the like. Therefore, for such cases, a light gathering lens may be provided along the light path from each of the light receiving mirrors 50 to the light receiving element 18.

In addition, for the scanner 20 in the above embodiment, while each flat member has been made as the optical scanning mirror 40 and the light receiving mirrors 50 by forming a mirror side on the surface of the flat member which is supported by beams 56 that enable it to be displaced, a light emitting element such as a laser diode or the like can be formed on the surface of the optical scanning mirror 40 in place of the mirror and for the surface of each of the light receiving mirrors 40, a light receiving element such as a photodiode or the like that performs photoelectric conversion can be formed in place of the mirror. Also, for the case when the light emitting element has been formed on the surface of the optical scanning mirror 40, the light path from the optical scanning mirror to the laser source becomes unnecessary and for the case when a light receiving element has been formed on the surface of each of the light receiving mirrors 50, the light path from each of the light receiving mirrors 50 to the light receiving element 18 becomes unnecessary, and thus, the miniaturization of the optical system of the optical scanner apparatus, not to mention the optical information scanning apparatus for reading optical information, becomes possible. Modifications of the above-described embodiments for these cases will be readily apparent to those skilled in the art.

Moreover, for the above embodiment, while the data for successively displacing at a predetermined time interval each of the mirrors 40, 50 have been stored inside RAM 35d beforehand and the driving signal has been produced by successively outputting the counter amount counted responsive to the clock signal, the amplitude data of the sine wave can also be used as the data for optical scanning and thus, sine waves can be produced, for example, using oscillators and these sine waves can then be used as the control signals for optical scanning.

Furthermore, while the electrostatic force produced when electrical voltage is applied between each mirror and the electrode opposite it, is used for the displacement of each of the mirrors 40, 50 for the above embodiment, each of the mirrors 40, 50 can be formed with magnetic materials and by placing magnetic field generation devices like small magnetic coils and solenoids in the electrodes, the magnetic force produced by the magnetic field generating devices can then be used for displacing each of the mirrors 40, 50.

Also, while the preferred embodiments of the present invention have been described in the context of a bar code reader which reads the bar code written on bar code labels, the optical scanning apparatus of this invention is not limited to bar code readers and can be applied to any apparatus that reads optical information from objects having optical information disposed thereon.

What is claimed is:

1. A light receiving assembly for an optical scanning apparatus, said assembly comprising:
    a substrate;
    a plurality of light receiving member support means disposed on said substrate; and
    a plurality of light receiving members, each of said light receiving members being mounted on a respective one of said plurality of light receiving member support means;
    wherein each of said light receiving member support means is for rotating its respective light receiving member about a first axis and about a second axis different from said first axis.

2. The light receiving assembly of claim 1, wherein each of said light receiving member support means comprises:
    connecting means for flexibly connecting to said light receiving member support means' respective light receiving member and to said substrate; and
    force generating means for generating a force between said respective light receiving member and said substrate to move said respective light receiving member and deform said connecting means.

3. The light receiving assembly of claim 1, wherein said plurality of light receiving members are reflective elements.

4. The light receiving assembly of claim 1, wherein said plurality of light receiving members are photoelectric elements.

5. The light receiving assembly of claim 2, wherein:

said force generating means comprises a plurality of electrodes electrically separate from said respective light receiving member to be capable of generating an electrostatic force thereon; and said plurality of electrodes are four electrodes capable of moving said respective light reflective member in a two-dimensional direction.

6. The light receiving assembly of claim 1, further comprising:

a scanning member support means disposed on said substrate; and a light scanning member mounted on said light scanning member support means;

wherein said light scanning member support means is for moving said light scanning member in at least a one-dimensional direction.

7. The light receiving assembly of claim 6, wherein said light scanning member is a reflective element.

8. The light receiving assembly of claim 6, wherein said light scanning member is a light generating element.

9. A light receiving assembly for an optical scanning apparatus in which light reflected from an information-bearing reading target irradiated by a light beam illuminates said assembly, said assembly comprising:

a substrate;

a scanning member support means disposed on said substrate;

a light scanning member, for generating said light beam irradiating said reading target, mounted on said light scanning member support means, said light scanning member support means being for moving said light scanning member in at least a one-dimensional direction to thereby change a point of irradiation of said reading target by said light beam responsive to movement of said light scanning member by said light scanning member support means;

a plurality of light receiving member support means disposed on said substrate; and a plurality of light receiving members, each of said light receiving members being mounted on a respective one of said plurality of light receiving member support means to receive light reflected by said reading target in a plurality of directions and reflect said received light to a sensor for generating an electrical signal representative of said information on said reading target;

wherein each of said light receiving member support means is for moving its respective light receiving member in at least a one-dimensional direction responsive to movement of said scanning member.

10. The light receiving assembly of claim 9, wherein said plurality of light receiving member support means and said plurality of light receiving members are disposed in an array.

11. The light receiving assembly of claim 9, wherein said light scanning member is a reflective element.

12. The light receiving assembly of claim 9, wherein said light scanning member is a light generating element.

13. The light receiving assembly of claim 9, wherein said light scanning member support means is further for moving said light scanning member in a two-dimensional direction.

14. The light receiving assembly of claim 9, wherein each of said light receiving member support means comprises:

connecting means for flexibly connecting to said light receiving member support means respective light receiving member and to said substrate; and force generating means for generating a force between said respective light receiving member and said substrate to move said respective light receiving member and deform said connecting means.

15. The light receiving assembly of claim 14, wherein said connecting means includes an inorganic elastic material.

16. The light receiving assembly of claim 14, wherein said force generating means comprises a plurality of electrodes electrically separate from said respective light receiving member to be capable of generating an electrostatic force thereon.

17. The light receiving assembly of claim 16, wherein said connecting means is electrically connected to said respective light receiving member to be capable of connecting said respective light receiving member to a source of reference potential.

18. The light receiving assembly of claim 16, wherein said plurality of electrodes are two electrodes capable of moving said respective light reflective member in a one-dimensional direction.

19. The light receiving assembly of claim 16, wherein said plurality of electrodes are four electrodes capable of moving said respective light reflective member in a two-dimensional direction.

20. A light receiving assembly for an optical scanning apparatus in which light reflected from an information-bearing reading target irradiated by a light beam illuminates said assembly, said assembly comprising:

a substrate;

a scanning member support means disposed on said substrate;

a light scanning member, for generating said light beam irradiating said reading target, mounted on said light scanning member support means, said light scanning member support means being for moving said light scanning member in at least a one-dimensional direction to thereby change a point of irradiation of said reading target by said light beam responsive to movement of said light scanning member by said light scanning member support means;

a plurality of light receiving member support means disposed on said substrate; and a plurality of light receiving members, each of said light receiving members being mounted on a respective one of said plurality of light receiving member support means to receive light reflected by said reading target in a plurality of directions and reflect said received light to a sensor for generating an electrical signal representative of said information on said reading target;

wherein each of said light receiving member support means is for moving its respective light receiving member in at least a one-dimensional direction responsive to movement of said scanning member at a timing having a same time period as a period of movement of said light scanning member so that said plurality of light receiving members receive light from said reading target at a same irradiation position, said light receiving member support means maintaining a relative angle between said light scanning member and respective ones of said light receiving members.

21. The light receiving assembly of claim 20, wherein said plurality of light receiving member support means and said plurality of light receiving members are disposed in an array.

22. The light receiving assembly of claim 20, wherein said light scanning member is a reflective element.

23. The light receiving assembly of claim 20, wherein said light scanning member is a light generating element.

24. The light receiving assembly of claim 20, wherein said light scanning member support means is further for moving said light scanning member in a two-dimensional direction.

25. The light receiving assembly of claim 20, wherein each of said light receiving member support means comprises:
   connecting means for flexibly connecting to said light receiving member support means respective light receiving member and to said substrate; and
   force generating means for generating a force between said respective light receiving member and said substrate to move said respective light receiving member and deform said connecting means.

26. The light receiving assembly of claim 25, wherein said connecting means includes an inorganic elastic material.

27. The light receiving assembly of claim 25, wherein said force generating means comprises a plurality of electrodes electrically separate from said respective light receiving member to be capable of generating an electrostatic force thereon.

28. The light receiving assembly of claim 27, wherein said connecting means is electrically connected to said respective light receiving member to be capable of connecting said respective light receiving member to a source of reference potential.

29. The light receiving assembly of claim 27, wherein said plurality of electrodes are two electrodes capable of moving said respective light reflective member in a one-dimensional direction.

30. The light receiving assembly of claim 27, wherein said plurality of electrodes are four electrodes capable of moving said respective light reflective member in a two-dimensional direction.

* * * * *